(12) United States Patent
Gao et al.

(10) Patent No.: US 11,138,250 B2
(45) Date of Patent: Oct. 5, 2021

(54) METHOD AND DEVICE FOR EXTRACTING CORE WORD OF COMMODITY SHORT TEXT

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Weiguo Gao, Beijing (CN); Haiyong Chen, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 426 days.

(21) Appl. No.: 16/089,579

(22) PCT Filed: Jan. 23, 2017

(86) PCT No.: PCT/CN2017/072157
§ 371 (c)(1),
(2) Date: Sep. 28, 2018

(87) PCT Pub. No.: WO2017/166912
PCT Pub. Date: Oct. 5, 2017

(65) Prior Publication Data
US 2020/0311113 A1     Oct. 1, 2020

(30) Foreign Application Priority Data
Mar. 30, 2016   (CN) .......................... 201610191177.3

(51) Int. Cl.
*G06F 16/00*     (2019.01)
*G06F 16/35*     (2019.01)
(Continued)

(52) U.S. Cl.
CPC .......... *G06F 16/35* (2019.01); *G06F 16/3344* (2019.01); *G06N 20/20* (2019.01)

(58) Field of Classification Search
CPC ...... G06F 16/3344; G06F 16/35; G06F 40/20; G06F 40/216; G06F 40/284; G06N 20/20
See application file for complete search history.

(56) References Cited

U.S. PATENT DOCUMENTS

| | | | |
|---|---|---|---|
| 2003/0069873 A1* | 4/2003 | Fox | G06F 16/338 |
| 2012/0209847 A1* | 8/2012 | Rangan | G06F 16/3347 707/737 |

(Continued)

FOREIGN PATENT DOCUMENTS

| | | |
|---|---|---|
| CN | 101184259 A | 5/2008 |
| CN | 102063469 A | 5/2011 |

(Continued)

OTHER PUBLICATIONS

Combined Chinese Office Action and Search Report dated Feb. 2, 2018 in Chinese Patent Application No. 201610191177.3 (with English translation of Category of Cited Documents), 11 pages.

(Continued)

*Primary Examiner* — Diedra McQuitery
(74) *Attorney, Agent, or Firm* — Oblon, McClelland, Maier & Neustadt, L.L.P.

(57) ABSTRACT

A method and a device for extracting a core word of a commodity short text, is provided. The method of extracting a core word of a commodity short text includes: obtaining commodity short texts in a data set; performing word segmenting on each commodity short text; obtaining a document vector of the commodity short text according to context information of word segments of the commodity short text; clustering the commodity short texts in the data set according to document vectors; determining a cluster level weight of each word segment of the commodity short (Continued)

text in a category to which the commodity short text belongs; and determining a core word of the commodity short text according to the cluster level weight of each word segment.

17 Claims, 8 Drawing Sheets

(51) Int. Cl.
*G06N 20/20* (2019.01)
*G06F 16/33* (2019.01)

(56) References Cited

U.S. PATENT DOCUMENTS

| | | | | |
|---|---|---|---|---|
| 2012/0209853 | A1* | 8/2012 | Desai | G06F 16/93 |
| | | | | 707/741 |
| 2015/0339288 | A1* | 11/2015 | Baker | G06F 40/205 |
| | | | | 704/9 |
| 2016/0103932 | A1* | 4/2016 | Sathish | G06F 3/04847 |
| | | | | 715/767 |

FOREIGN PATENT DOCUMENTS

| | | |
|---|---|---|
| CN | 103136300 A | 6/2013 |
| CN | 103186662 A | 7/2013 |
| CN | 103646074 A | 3/2014 |
| CN | 104008186 A | 8/2014 |
| CN | 104834747 A | 8/2015 |
| CN | 104866572 A | 8/2015 |
| CN | 105808526 A | 7/2016 |
| JP | 11-120183 A | 4/1999 |

OTHER PUBLICATIONS

Combined Chinese Office Action and Search Report dated Oct. 24, 2018 in Chinese Patent Application No. 201610191177.3 (with English translation of Category of Cited Documents), 11 pages.
International Search Report dated Apr. 26, 2017 in PCT/CN2017/072157, 12 pages.
Liao, H., et al., "Text feature word selection based on relationship between words", Computer Applications, vol. 27 No. 12, Dec. 2007, pp. 3009-3012 with cover pages (with English abstract).
Xing-Dong, S., et al., "Research and Implementation of Micro-blog Keyword Extraction Method Based on Clustering", Netinfo Security, vol. 12, 2014, pp. 27-31.
Indian Office Action issued in Indian Patent Application No. 201837038917 dated Jun. 24, 2021, (w/ English translation).

* cited by examiner

METHOD AND DEVICE FOR EXTRACTING CORE WORD OF COMMODITY SHORT TEXT

TECHNICAL FIELD

The present disclosure relates to the field of big data processing, and in particular to a method and a device for extracting a core word of a commodity short text.

BACKGROUND

With the rapid development of e-commerce websites, e-commerce websites offer a wide variety of commodities and very detailed product information, and more and more customers buy and comment on commodities on the Internet. Therefore, the e-commerce websites generate a large amount of commodity title data and commodity review data. Early methods of mining core words by manually labeling have been unable to adapt to the need to mine core words from massive commodity data.

At present, Bag of Words (BOW) model is generally used to automatically extract the core words of texts. In the Bag of Words model, the text is treated as an unordered collection of words, ignoring the grammar and even the order of the words. Therefore, this method works well when extracting the core words of long text, and it is not effective when used for short texts. Compared with a long texts, a short text contains fewer words, so it has the characteristics of sparse features and unclear themes, and it is more difficult to accurately extract core words from the short texts.

SUMMARY

The present disclosure provides a method and a device for extracting a core word of a commodity short text, which is used for improving the accuracy of extracting a core word from a commodity short text.

According to a first aspect of the present disclosure, there is provided a method for extracting a core word of a commodity short text, comprising: obtaining commodity short texts in a data set; performing word segmenting on each commodity short text; obtaining a document vector of the commodity short text according to context information of word segments of the commodity short text; clustering the commodity short texts in the data set according to document vectors; determining a cluster level weight of each word segment of the commodity short text in a category to which the commodity short text belongs; determining a core word of the commodity short text according to the cluster level weight of each word segment.

In some embodiments, the determining a core word of the commodity short text according to the cluster level weight of each word segment comprises: determining a core word of the commodity short text according to the cluster level weight and at least one of a local weight or a document level weight of each word segment; wherein the local weight is determined in the following manner: determining one or more commodity word attributes of each word segment in the commodity short text; determining a word attribute weight corresponding to the word segment in the commodity short text according to a correspondence between commodity word attributes and word attribute weights; determining a local weight of each word segment according to the word attribute weight of each word segment in the commodity short text; wherein the document level weight of each word segment is determined according to an inverse file frequency of each word segment of the commodity short text in the data set.

In some embodiments, wherein the obtaining a document vector of the commodity short text according to context information of word segments of the commodity short text comprises: determining a window parameter according to an average length of the commodity short texts in the data set; performing computation by using a vector operation tool word2vec and taking the data set as an input corpus and taking the window parameter as a window size to obtain a document vector of the commodity short text in the data set.

In some embodiments, the determining cluster level weight of each word segment of the commodity short text in a category to which the commodity short text belongs comprises: calculating a chi-square value of each word segment of the commodity short text in the category to which the commodity short text belongs by using a chi-square formula; determining a cluster level weight of each word segment of the commodity short text in the category to which the commodity short text belongs according to the chi-square value.

In some embodiments, the method for extracting a word segment of a commodity short text further comprises: obtaining a training corpus which includes commodity short texts for training; marking core words of the commodity short texts for training and commodity word attributes corresponding to the core words; determining each word attribute weight corresponding to each commodity word attribute according to a ratio of a number of core words having the same commodity word attribute to a number of all core words in the training corpus, so as to obtain a correspondence between commodity word attributes and word attribute weights.

In some embodiments, the method for extracting a word segment of a commodity short text further comprises: establishing a correspondence between search words used by users during searching and commodity short texts they clicked; marking the search words as core words of the corresponding commodity short texts, and marking the commodity word attributes corresponding to the core words; determining each word attribute weight corresponding to each commodity word attribute according to a ratio of a number of core words having the same commodity word attribute to a number of all core words in a training corpus, so as to obtain a correspondence between commodity word attributes and word attribute weights.

In some embodiments, the determining a core word of the commodity short text according to the cluster level weight and at least one of a local weight or a document level weight of each word segment comprises: calculating a weighted sum of the cluster level weight and at least one of a local weight or a document level weight of each segment as a core weight of each word segment; determining a word segment of which the value of core weight is the largest in the commodity short text as a core word of the commodity short text.

In some embodiments, the method for extracting a word segment of a commodity short text further comprises: word segmenting each commodity short text in a training data set; marking core words and non-core words of each commodity short text in the training data set; calculating a cluster level weight and at least one of a local weight or a document level weight of each word segment in the training data set; calculating a weighting coefficient of the cluster level weight and at least one of the local weight or the document level weight using a machine learning method according to the cluster level weight and at least one of the local weight or the document level weight of each word segment in the training data set by taking the core words as positive samples and taking the non-core words as negative samples.

In some embodiments, the commodity short texts include a commodity title, commodity review or commodity information page content.

In some embodiments, the commodity word attributes include one or more of brand, series name, category, style, noun, attribute word and modifier.

According to a second aspect of the present disclosure, there is provided a device for extracting a core word of a commodity short text, comprising: a memory; and a processor coupled to the memory, which is configured to execute the method for performing operations comprising: obtaining commodity short texts in a data set; performing word segmenting on each commodity short text; obtaining a document vector of the commodity short text according to context information of word segments of the commodity short text; clustering the commodity short texts in the data set according to document vectors; determining a cluster level weight of each word segment of the commodity short text in a category to which the commodity short text belongs; determining a core word of the commodity short text according to the cluster level weight of each word segment.

In some embodiments, the determining a core word of the commodity short text according to the cluster level weight of each word segment comprises: determining a core word of the commodity short text according to the cluster level weight and at least one of a local weight or a document level weight of each word segment; wherein the local weight is determined in the following manner: determining one or more commodity word attributes of each word segment in the commodity short text; determining a word attribute weight corresponding to the word segment in the commodity short text according to a correspondence between commodity word attributes and word attribute weights; determining a local weight of each word segment according to the word attribute weight of each word segment in the commodity short text; wherein the document level weight of each word segment is determined according to an inverse file frequency of each word segment of the commodity short text in the data set.

In some embodiments, the obtaining a document vector of the commodity short text according to context information of word segments of the commodity short text comprises: determining a window parameter according to an average length of the commodity short texts in the data set; performing computation by using a vector operation tool word2vec and taking the data set as an input corpus and taking the window parameter as a window size to obtain a document vector of the commodity short text in the data set.

In some embodiments, the determining cluster level weight of each word segment of the commodity short text in a category to which the commodity short text belongs comprises: calculating a chi-square value of each word segment of the commodity short text in the category to which the commodity short text belongs by using a chi-square formula; determining a cluster level weight of each word segment of the commodity short text in the category to which the commodity short text belongs according to the chi-square value.

In some embodiments, the operations further comprise: obtaining a training corpus which includes commodity short texts for training; marking core words of the commodity short texts for training and commodity word attributes corresponding to the core words; determining each word attribute weight corresponding to each commodity word attribute according to a ratio of a number of core words having the same commodity word attribute to a number of all core words in the training corpus, so as to obtain a correspondence between commodity word attributes and word attribute weights.

In some embodiments, the operations further comprise: establishing a correspondence between search words used by users during searching and commodity short texts they clicked; marking the search words as core words of the corresponding commodity short texts, and marking the commodity word attributes corresponding to the core words; determining each word attribute weight corresponding to each commodity word attribute according to a ratio of a number of core words having the same commodity word attribute to a number of all core words in a training corpus, so as to obtain a correspondence between commodity word attributes and word attribute weights.

In some embodiments, the determining a core word of the commodity short text according to the cluster level weight and at least one of a local weight or a document level weight of each word segment comprises: calculating a weighted sum of the cluster level weight and at least one of a local weight or a document level weight of each segment as a core weight of each word segment; determining a word segment of which the value of core weight is the largest in the commodity short text as a core word of the commodity short text as a core word of the commodity short text.

In some embodiments, the operations further comprise: word segmenting each commodity short text in a training data set; marking core words and non-core words of each commodity short text in the training data set; calculating a cluster level weight and at least one of a local weight or a document level weight of each word segment in the training data set; calculating a weighting coefficient of the cluster level weight and at least one of the local weight or the document level weight using a machine learning method according to the cluster level weight and at least one of the local weight or the document level weight of each word segment in the training data set by taking the core words as positive samples and taking the non-core words as negative samples.

According to a third aspect of the present disclosure, there is provided a computer readable storage medium storing a computer program that, when being executed by a processor, implements the method for performing operations comprising: obtaining commodity short texts in a data set; performing word segmenting on each commodity short text; obtaining a document vector of the commodity short text according to context information of word segments of the commodity short text; clustering the commodity short texts in the data set according to document vectors; determining a cluster level weight of each word segment of the commodity short text in a category to which the commodity short text belongs; determining a core word of the commodity short text according to the cluster level weight of each word segment.

Further features of the present disclosure, as well as advantages thereof, will become clearer from the following detailed description of exemplary embodiments of the present disclosure with reference to the accompanying drawings.

BRIEF DESCRIPTION OF THE DRAWINGS

In order to more clearly explain the embodiments of the present disclosure or the technical solutions in the prior art, a brief introduction will be given below for the drawings required to be used in the description of the embodiments or the prior art. It is obvious that, the drawings illustrated as follows are merely some of the embodiments of the present utility model. For a person skilled in the art, he or she may also acquire other drawings according to such drawings on the premise that no inventive effort is involved.

DETAILED DESCRIPTION OF THE EMBODIMENTS

The technical solutions of the embodiments of the present disclosure will be clearly and completely described below with reference to the drawings of the embodiments of the present disclosure. Obviously, the described embodiments are just a part of the embodiments of the present disclosure, instead of all of them. The following description of at least one of the exemplary embodiments is actually merely illustrative, and is not meant to be limitation on the present disclosure and its application or use in any way. All other embodiments obtained by persons of ordinary skill in the art based on the embodiments of the present disclosure without creative efforts shall fall within the protection scope of the present disclosure.

The present disclosure is proposed to improve the accuracy of extracting a core word from a commodity short text. In the present disclosure, a commodity short text can be taken as a document, which usually has the characteristics of sparse features and unclear themes, etc.

In the following part, a method for extracting a core word of a commodity short text in some embodiments of the present disclosure is described with reference to FIG. 1.

Figure 1:
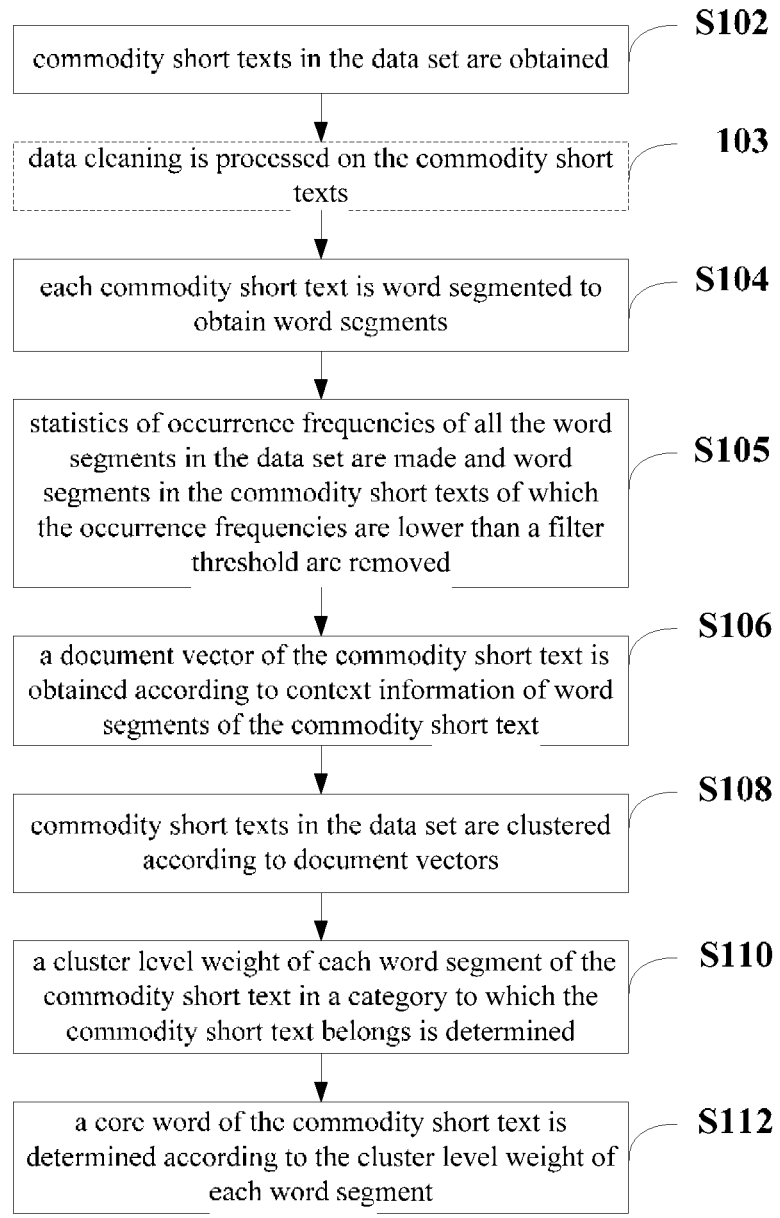
FIG. 1 is a flow chart of some embodiments of a method for extracting a core word of a commodity short text in the present disclosure.

FIG. 1 is a flow chart of some embodiments of a method for extracting a core word of a commodity short text in the present disclosure. As shown in FIG. 1, the method of the embodiments include the following steps.

First of all, commodity short texts in a data set are pre-processed to obtain word segments of each of the commodity short texts. For example, the pre-processing can be carried out by steps S102-S105.

At step S102, commodity short texts in the data set are obtained.

The data set is a collection of commodity short texts to be tested, and can be acquired from a database for storing commodity short texts. For instance, commodity short text data can be searched and obtained by using hive, a data warehouse tool provided by Hadoop, and can also be obtained in other manners, such as by website crawler or the like, according to service requirements and system setting. The commodity short text may be, for example, a commodity title, a commodity review, or a commodity information page content, etc., and the commodity information page content may be, for example, short text information about the material and type of the commodity.

At step S103, data cleaning is processed on the commodity short texts.

Step S103 can be performed selectively according to service requirements. Data cleaning may include, for example, removing stop words and punctuation marks in the commodity short texts to improve the effect of data processing subsequently. The stop words can be preset. For example, a stop word list containing nonsense or non-target words such as auxiliary words and interjections, etc. may be set, so the data set can be cleaned according to the stop word list.

At step S104, each commodity short text is word segmented to obtain word segments.

At step S105, statistics of occurrence frequencies of all the word segments in the data set are made and word segments in the commodity short texts of which the occurrence frequencies are lower than a filter threshold are removed.

Step S105 can be performed selectively after performing word segmenting according to service requirements. By filtering word segments of which the occurrence frequencies are lower than a filter threshold, the efficiency of extracting core words can be improved.

After the pre-processing, a cluster level weight of a word segment can be determined to evaluate the importance of the word segment in a certain category. For example, a cluster level weight of a word segment can be determined by using S106-S110.

At S106, a document vector of the commodity short text is obtained according to context information of word segments of the commodity short text.

One implementing method is to obtain a document vector of the commodity short text by using a vector operation tool word2vec based on the context of word segments, so that each commodity short text is represented as a k-dimensional vector, and the specific dimension can be set.

When calculating the document vector by using the word2vec tool, an input parameter can also be adjusted so as to optimize the result. For example, a window parameter can be determined according to an average length of the commodity short texts in the data set, and computation can be performed by taking the data set as an input corpus and taking the window parameter as a window size to obtain the document vector of the commodity short text in the data set. The accuracy and efficiency of calculating the document vector can be improved by reasonably determining the window size parameter. For example, the size parameter can also be optimized. The size parameter is used for indicating the size of a vector. When the value of the size parameter is larger, the calculation will be more accurate, but the requirement of the performance of the computing device will be more strict accordingly. During use, the size parameter can be adjusted as needed.

At step S108, commodity short texts in the data set are clustered according to document vectors.

Since the document vector can abstract the commodity short texts into several points in a vector space, clustering can be performed by using the existing distance-based clustering algorithm, such as K-MEANS algorithm, K-MEDOIDS algorithm, BIRCH algorithm, etc. By inputting the document vectors into a particular clustering algorithm for clustering, different categories can be obtained.

When performing clustering, it is also necessary to determine a number of clusters reasonably, so that short texts of a certain type of commodities with common features can be divided into one cluster as much as possible, and it is avoided that the commodity short texts with large differences be classified into one cluster or commodity short texts of close similarity be grouped into different clusters.

For commodity short texts, the number of clusters can be determined according to the number of commodity categories. For example, the number of clusters can be set to be roughly equal to the number of commodity categories. Category refers to the name of class of commodities in an e-commerce website as classified according to the characteristics of the commodities, such as women's clothing, luggage, daily chemicals, digital products, etc. The specific category quantity, name, subdivision degree, etc. can be set based on service requirements and product conditions. In this way, the result of clustering based on the document vector is more accurate. Furthermore, a core word can be extracted more accurately from a commodity short text according to the weights of word segments in a cluster category to which the commodity short text belongs.

At step S110, a cluster level weight of each word segment of the commodity short text in a category to which the commodity short text belongs is determined.

The cluster level weight can be determined by calculating the correlation between the word segment in the commodity short text and the category to which the commodity short text belongs. For example, after a chi-square value of each word segment of the commodity short text in the category to which the commodity short text belongs is calculated by using a chi-square formula, a cluster level weight of each word segment of the commodity short text in the category to which the commodity short text belongs can be determined according to the chi-square value.

For example, for the short text "Apple iPhone 6s Plus (A1699) 64G Rose Gold Mobile Unicom Telecom 4G mobile phone", after the clustering operation in step S108, the short text belongs to the "digital product" category. The chi-square value of the word segment "mobile phone" may be calculated, for example, with reference to Table 1. Table 1 is an independent sample fourfold table of the chi-square algorithm. As shown in Table 1, let A be the number of short texts that "Mobile Phone" appears in the category "Digital Product", B be the number of short texts that "Mobile Phone" appears in categories other than "Digital Product", and C be the number of short texts that the category "Digital Products" does not contain "Mobile Phone", D be the number of short texts that categories other than "Digital Product" do not contain "Mobile Phone", and N be the number of all commodity short texts participating in the clustering.

TABLE 1

| | Belong to "Digital Product" | Not belong to "Digital Product" | Total |
|---|---|---|---|
| Contain "Mobile Phone" | A | B | A + B |
| NOT Contain "Mobile Phone" | C | D | C + D |
| Total | A + C | B + D | N |

For a chi-square value of the word segment "Mobile Phone" in the short text "Apple iPhone 6s Plus (A1699) 64G Rose Gold Mobile Unicorn Telecom 4G mobile phone", calculation may be performed by using the formula (1).

$$K^2 = \frac{N*(A*D - B*D)^2}{(A+B)*(A+C)*(B+D)*(C+D)} \quad (1)$$

The chi-square value $K^2$ is a cluster level weight of "Mobile Phone" in the short text.

Thereafter, a core word is determined by using the step S112.

At step S112, a core word of the commodity short text is determined according to the cluster level weight of each word segment.

For example, after determining the cluster level weight of each word segment in the commodity short text, the word segment having the largest value of cluster level weight can be taken as the core word. The core word can also be determined by using other methods as needed based on the values of cluster level weights.

By obtaining a document vector of a commodity short text with reference to context information of word segments in the commodity short text, it is possible to make up for the shortcoming of an insufficient amount of short text information, so the result of clustering based on the document vector is more accurate. Furthermore, the core word can be extracted more accurately from the commodity short text according to the weights of the word segments in the cluster category to which the commodity short text belongs.

When determining a core word of the commodity short text, besides the cluster level weight of the word segment, the result can also be optimized according to other weights. For example, the degree of importance of the commodity word attribute corresponding to a word segment in a single piece of commodity short text can be evaluated according to the local weight thereof, and/or the degree of importance of a word segment in the whole data set can also be evaluated according to the document level weight thereof. In the following part, the case of optimizing the result by the cluster level weight with reference to other weights will be described.

A method for extracting a core word of a commodity short text in some other embodiments of the present disclosure will be described below with reference to FIG. 2.

Figure 2:
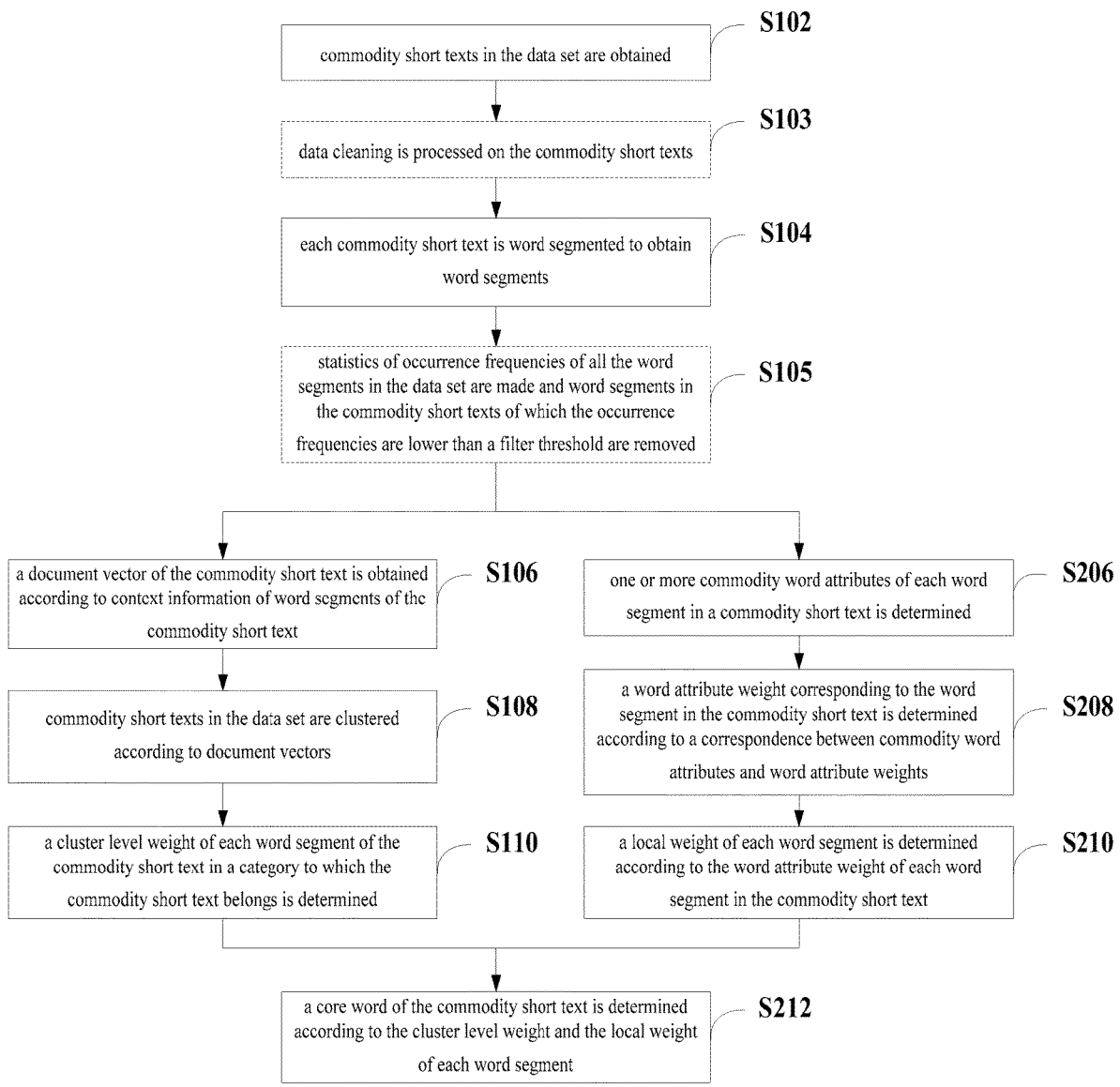
FIG. 2 is a flow chart of some other embodiments of a method for extracting a core word of a commodity short text in the present disclosure.

FIG. 2 is a flow chart of some other embodiments of a method for extracting a core word of a commodity short text in the present disclosure. As shown in FIG. 2, the method of the embodiments include the following steps.

First of all, commodity short texts in a data set may be pre-processed to obtain word segments of commodity short texts. The pre-processing can be implemented with reference to, for example, steps S102-S105 as described previously.

After the pre-processing, in addition to determining a cluster level weight of a word segment (please refer to steps S106-S110), a local weight of the word segment can also be determined so as to evaluate the degree of importance of the word segment in a single piece of commodity short text. For example, the local weight can be determined by adopting steps S206-S210.

At step S206, one or more commodity word attributes of each word segment in a commodity short text is determined.

In the embodiments of the present disclosure, the commodity word attribute refers to word attribute for introducing the characteristics of the commodity, such as brand, series name, category, noun, attribute word, style, modifier, book title and author, etc. The same word segment in the same commodity short text can have a variety of commodity word attributes.

Before adopting the method of the present embodiments, it is possible to preset a commodity word attribute dictionary which includes several words and the corresponding commodity word attributes. When determining the commodity word attributes of each word segment in a commodity short text, commodity word attribute corresponding to each word segment in the commodity word attribute dictionary can be searched one by one and marked.

At step S208, a word attribute weight corresponding to the word segment in the commodity short text is determined according to a correspondence between commodity word attributes and word attribute weights.

Word attribute weight refers to the degree of importance of a certain type of commodity word attribute in the commodity short text. For example, in a commodity title, brands and categories are relatively important words, while attribute words such as "500 ml" and "2 meters" are words of lower importance. Therefore, the word attribute weight corresponding to the commodity word attribute can be set according to the importance of the commodity word attribute and the specific service requirements. The above process can be set manually or determined by a method based on statistics.

At step S210, a local weight of each word segment is determined according to the word attribute weight of each word segment in the commodity short text.

When a word segment has a variety of commodity word attributes, the word attribute weights corresponding to the commodity word attributes can be accumulated. Moreover, when determining a local weight, the word attribute weight corresponding to the word segment can be directly taken as a local weight, and it is also possible to normalize the word attribute weights of all the word segments in the commodity short text and take the result of normalization as a local weight of each word segment. Let x be a local weight of a certain word segment before normalization, y be a local weight of the word segment after normalization, and min and max respectively be the minimum and maximum of the local weight in the commodity short text to which the word segment belongs. The value of y can be normalized by formula (2).

$$y=(x-\min)/(\max-\min) \quad (2)$$

Through the normalized processing, the statistical distribution characteristics of a local weight of each word segment can be visually reflected.

Thereafter, a core word is determined by using the step S212.

At step S212, a core word of the commodity short text is determined according to the cluster level weight and the local weight of each word segment.

The result can be further optimized from the perspective of commodity word attribute according to the characteristics of the commodity short text on a basis of the cluster level weight and with reference to the local weight of the word segment, so as to improve the accuracy of determining the core word.

The present disclosure also provides a method for establishing a correspondence between commodity word attributes and word attribute weights in a statistics-based manner.

An exemplary method is, first of all, to obtain a training corpus which includes commodity short texts for training. Then, to mark the core words of the commodity short texts for training and commodity word attributes corresponding to the core words, wherein, for example, it is possible to use an offline dictionary to mark the core words and their commodity word attributes thereof and then mark the commodity word attributes of the core words in the training corpus by using the core words and corresponding commodity word attributes thereof recorded in the dictionary. At last, determining each word attribute weight corresponding to each commodity word attribute according to a ratio of a number of core words having the same commodity word attribute to a number of all core words in the training corpus, so as to obtain a correspondence between commodity word attributes and word attribute weights.

Another exemplary method can also automatically mark core words based on users' search behavior. First of all, establish a correspondence between search words used by users during searching and commodity short texts they clicked. Then, mark the search words as core words of the corresponding commodity short texts, and mark the commodity word attributes corresponding to the core words. At last, determining each word attribute weight corresponding to each commodity word attribute according to a ratio of a number of core words having the same commodity word attribute to a number of all core words in a training corpus, so as to obtain a correspondence between commodity word attributes and word attribute weights. At the time of establishing a correspondence between search words used by the users during searching and the commodity short texts they clicked and marking core words, it is possible to use a search-click log to establish the correspondence between the search words and the commodity short texts they clicked and perform marking. For example, according to the search-click log, a user uses the search word "Mobile Phone" to search for a commodity, and the search results are "Apple iPhone 6s 64G Deep Space Gray Telecom 4G Mobile Phone" and "Millet Note White Mobile 4G Mobile Phone", and the user clicked the former, i.e., "Apple iPhone 6s 64G Deep Space Gray Telecom 4G Mobile Phone", and accordingly "Mobile Phone" is marked as the core word of "Apple iPhone 6s 64G Deep Space Gray Telecom 4G Mobile Phone".

By using the aforementioned statistics-based method to determine the word attribute weight corresponding to the commodity word attribute, the value of the word attribute weight is more applicable to the current environment of use thereby to improve the accuracy of core word extraction.

In the following part, a method for extracting a core word of a commodity short text in some other embodiments of the present disclosure is described with reference to FIG. 3A.

Figure 3A:
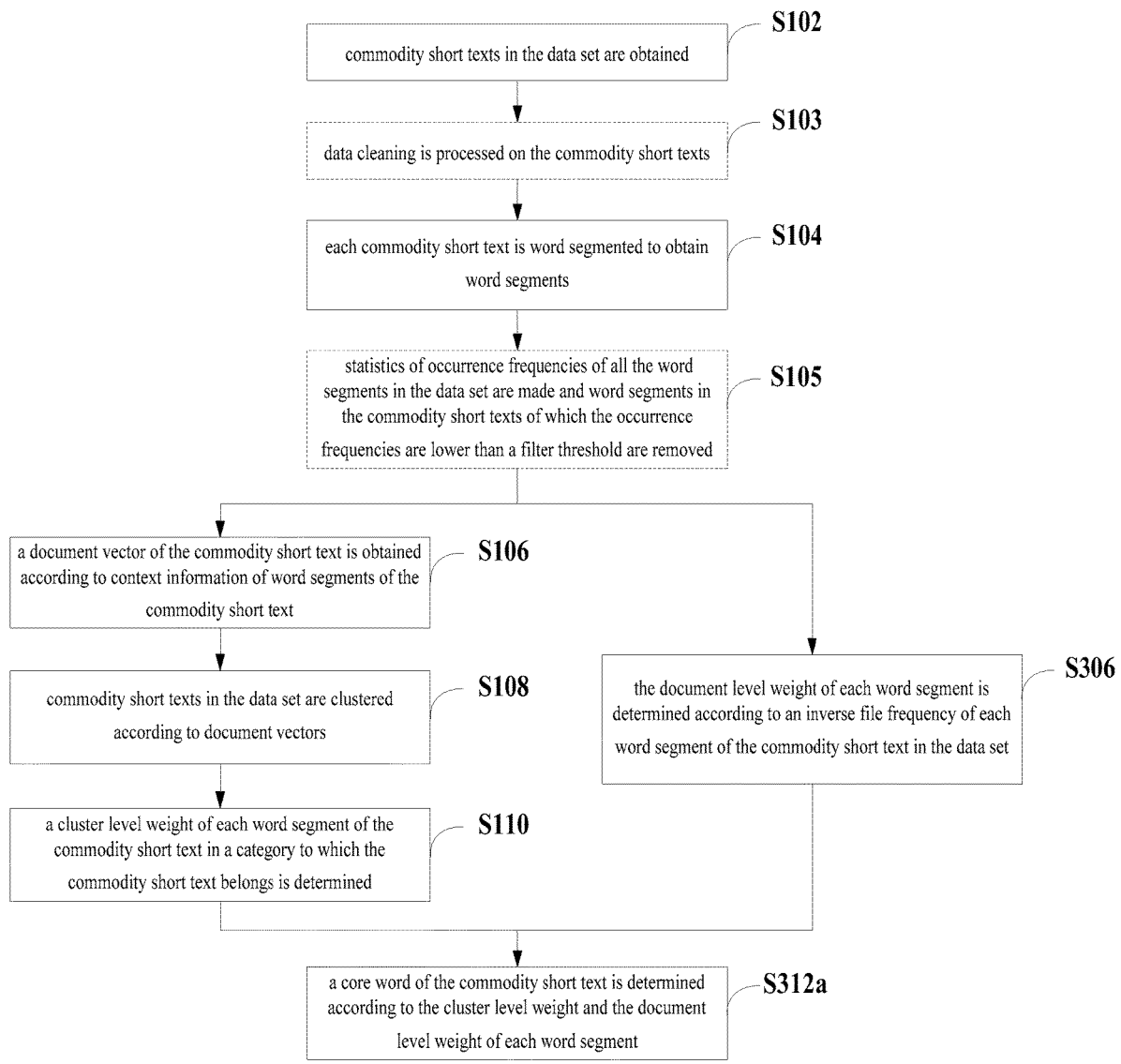
FIG. 3A is a flow chart of still some other embodiments of a method for extracting a core word of a commodity short text in the present disclosure.

FIG. 3A is a flow chart of some other embodiments of a method for extracting a core word of a commodity short text in the present disclosure. As shown in FIG. 3A, the method of the embodiments include the following steps.

First of all, commodity short texts in a data set are pre-processed to obtain word segments of commodity short texts. The pre-processing can be implemented with reference to, for example, steps S102-S105 as described previously.

After the pre-processing, in addition to determining a cluster level weight of a word segment (please refer to steps S106-S110), a document level weight of the word segment can also be determined so as to evaluate the degree of importance of the word segment in all of the commodity short texts in a data set. For example, the document level weight can be determined by using the step S306.

At step S306, the document level weight of each word segment is determined according to an inverse file frequency of each word segment of the commodity short text in the data set.

The inverse document frequency (IDF or idf) refers to the occurrence frequency of documents having a certain word segment in a corpus. The higher the frequency is, the smaller the corresponding idf value is. That is, if a word segment appears in a large number of different documents, it means that the word segment cannot represent characteristics of a certain document. Since each piece of commodity short text is equivalent to a document, the idf value of the inverse document frequency of each word segment of the commodity short text in the data set may be calculated by using the formula (3).

$$idf = \log\left(\frac{M}{L}\right) \quad (3)$$

M represents a total number of commodity short texts, L represents a number of commodity short texts including a certain word segment, and the idf value represents a document level weight of the word segment in a commodity short text.

Thereafter, a core word is determined by using the step S312a.

At step S312a, a core word of the commodity short text is determined according to the cluster level weight and the document level weight of each word segment.

The process of extracting the core word can be further optimized from the importance of the level of data set on a basis of the cluster level weights with reference to the document level weights of the word segments, so as to improve the accuracy of determining the core word.

Figure 3B:
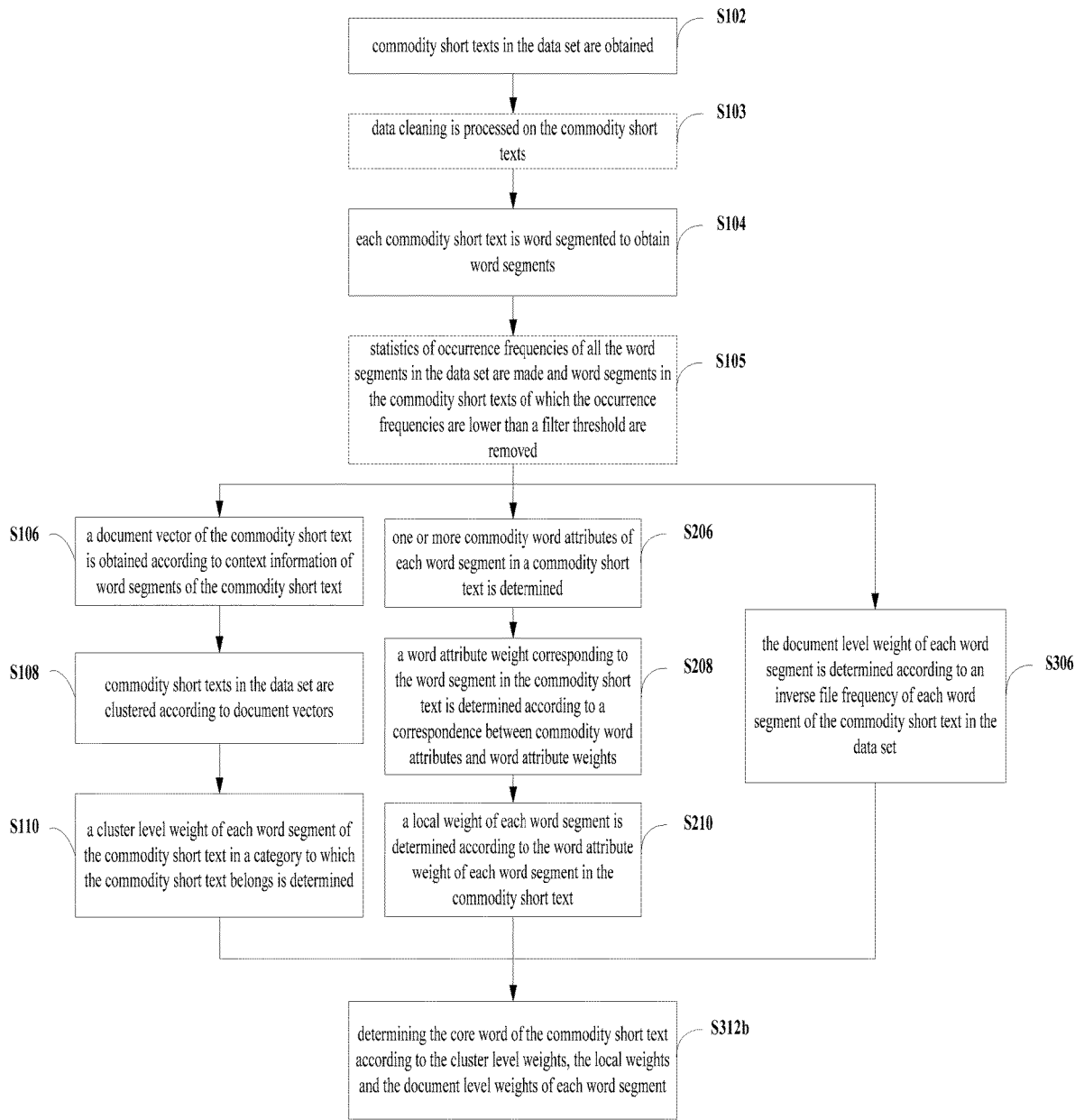
FIG. 3B is a flow chart of still some other embodiments of a method for extracting a core word of a commodity short text in the present disclosure.

Apparently, based on the method of extracting a core word described in FIGS. 1-3, it is also possible to obtain cluster level weights, local weights and document level weights with reference to the embodiments. And then take the cluster level weights, local weights and document level weights together as the basis of determining the core word, that is, to execute step S312b. Namely, to determine the core word of the commodity short text according to the cluster level weights, the local weights and the document level weights of each word segment. The aforementioned method for extracting a core word of a commodity short text can be referred to, for example, FIG. 3B.

When determining a core word according to more than one kind of weight, it is possible to calculate a weighted sum of the cluster level weight and at least of the local weight or the document level weight of each word segment as a core weight of each word segment, and then determine a word segment of which the value of core weight is the largest in the commodity short text as a core word of the commodity short text. The method for determining a weighting coefficient of various weights in the present disclosure is described below with reference to FIG. 4.

Figure 4:
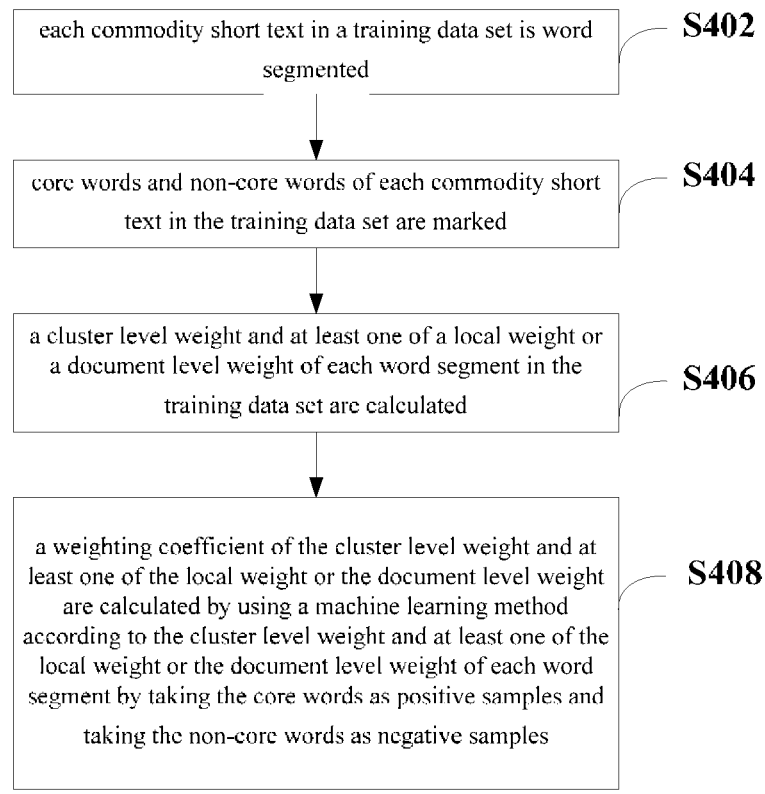
FIG. 4 is a flow chart of some embodiments of determining weighting coefficients of various weights in the present disclosure.

FIG. 4 is a flowchart of a method for determining a weighting coefficient of various weights in the present disclosure. As shown in FIG. 4, the method of the embodiments include the following steps.

At step S402, each commodity short text in a training data set is word segmented.

At step S404, core words and non-core words of each commodity short text in the training data set are marked.

For example, the core words and the non-core words can be marked in a manually marking manner; and search words used by users during searching can also be taken as core words corresponding to search results clicked by the users on a basis of a search-click log.

At step S406, a cluster level weight and at least one of a local weight or a document level weight of each word segment in the training data set are calculated.

The specific calculation method is the method for calculating a local weight, a document level weight and a cluster level weight of each word segment described in the previous embodiments.

At step S408, a weighting coefficient of the cluster level weight and at least one of the local weight or the document level weight are calculated by using a machine learning method, such as linear regression, decision tree, neural network and other algorithms, according to the cluster level weight and at least one of the local weight or the document level weight of each word segment by taking the core words as positive samples and taking the non-core words as negative samples.

By using the above method, when determining the core word in a commodity short text according to a plurality of weights, the proportions of different weights can be adjusted to improve the accuracy of determining the core word.

Apparently, it is also possible to directly obtain a sum of different weights to serve as a core weight, that is, the weighting coefficients of all the weights are 1, so as to make the calculation convenient.

In the following part, a device for extracting a core word of a commodity short text in some embodiments of the present disclosure is described with reference to FIG. 5.

Figure 5:
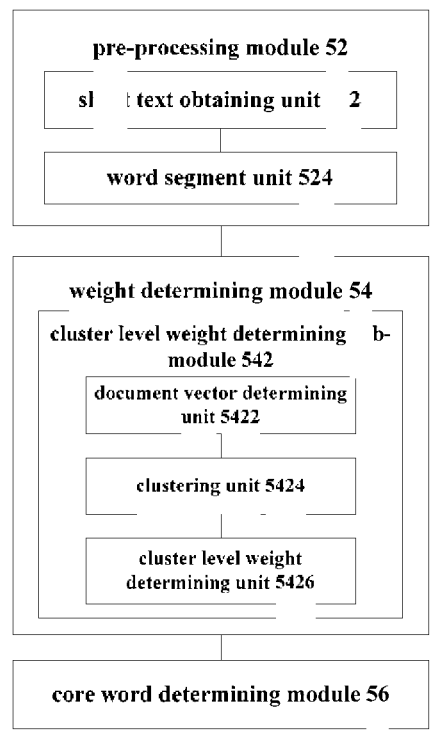
FIG. 5 is a structural diagram of some embodiments of a device for extracting a core word of a commodity short text in the present disclosure.

FIG. 5 is a structural diagram of some embodiments of a device for extracting a core word of a commodity short text in the present disclosure. As shown in FIG. 5, the device of the embodiments include: a pre-processing module 52, a weight determining module 54 and a core word determining module 56. The pre-processing module 52 includes: a short text obtaining unit 522 for obtaining commodity short texts in a data set; a word segment unit 524 for performing word segmenting on each commodity short text. The weight determining module 54 includes a cluster level weight determining sub-module 542 for determining a weight of each of the word segments in the commodity short text. The cluster level weight determining sub-module 542 comprises: a document vector determining unit 5422 for obtaining a document vector of the commodity short text according to context information of the word segments of the commodity short text; a clustering unit 5424 for clustering the commodity short texts in the data set according to document vectors; a cluster level weight determining unit 5426 for determining a cluster level weight of each word segment of the commodity short text in a category to which the commodity short text belongs. The core word determining module 56 is used for determining a core word of the commodity short text according to the cluster level weight of each word segment.

By using a document vector determining unit to obtain a document vector of a commodity short text with reference to context information of word segments in the commodity short text, it is possible to make up for the shortcoming of an insufficient amount of short text information, so the result of clustering based on the document vector by the clustering unit is more accurate. Furthermore, the core word can be extracted more accurately from the commodity short text by the cluster level weight determining unit according to the weight in the cluster category to which the commodity short text belongs.

In some embodiments, a commodity short text may include a commodity title or a commodity review.

In some embodiments, the document vector determining unit 5422 can be used for determining a window parameter according to an average length of the commodity short texts in the data set, and performing computation by using a vector operation tool word2vec and taking the data set as an input corpus and taking the window parameter as a window size to obtain a document vector of the commodity short text in the data set.

In some embodiments, a number of clusters by the clustering unit 5424 can be determined according to a number of commodity categories to make the result of clustering based on the document vector more accurate. Furthermore, the core word can be extracted more accurately from the commodity short text according to the weights of the word segments in the cluster category to which the commodity short text belongs.

In some embodiments, the cluster level weight determining unit 5426 can be used for calculating a chi-square value of each word segment of the commodity short text in the category to which the commodity short text belongs by using a chi-square formula, and determining a cluster level weight of each word segment of the commodity short text in the category to which the commodity short text belongs according to the chi-square value.

In the following part, a device for extracting a core word of a commodity short text in some other embodiments of the present disclosure is described with reference to FIG. 6.

Figure 6:
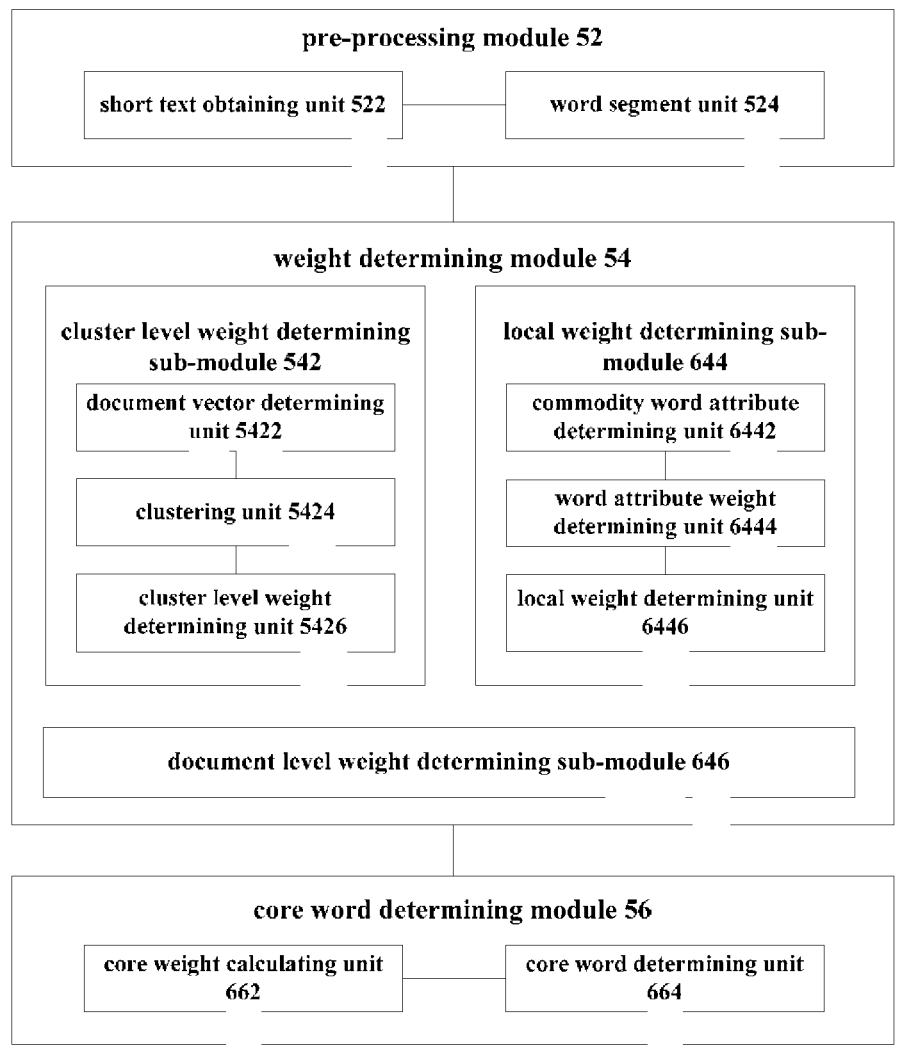
FIG. 6 is a structural diagram of some other embodiments of a device for extracting a core word of a commodity short text in the present disclosure.

FIG. 6 is a structural diagram of some other embodiments of a device for extracting a core word of a commodity short text in the present disclosure. As shown in FIG. 6, the weight determining module 54 in the embodiments also includes at least one of a local weight determining sub-module 644 or a document level weight determining sub-module 646.

In some embodiments, the local weight determining sub-module 644 comprises: a commodity word attribute determining unit 6442 for determining one or more commodity word attributes of each word segment in the commodity short text; a word attribute weight determining unit 6444 for determining a word attribute weight corresponding to the word segment in the commodity short text according to a correspondence between commodity word attributes and word attribute weights; a local weight determining unit 6446 for determining a local weight of each word segment according to the word attribute weight of each word segment in the commodity short text. The result can be further optimized from the perspective of commodity word attribute according to the characteristics of the commodity short text on a basis of setting a cluster level weight determining sub-module and by combining with a local weight determining sub-module, so as to improve the accuracy of determining the core word.

In some embodiments, the document level weight determining sub-module 646 is used for determining a document level weight of each word segment according to an inverse file frequency of each word segment of the commodity short text in the data set. On a basis of setting a cluster level weight determining sub-module and by combining with a document level weight determining sub-module, the process of extracting the core word can be further optimized from the importance of the level of data set, so as to improve the accuracy of determining the core word.

In some embodiments, the commodity word attributes may include one or more of brand, series name, category, style, noun, attribute word and modifier.

In some embodiments, the local weight determining unit 6446 is used for normalizing the word attribute weight corresponding to each word segment in the commodity short text to obtain the local weight of each word segment. By means of the normalized processing, the statistical distribution characteristics of the local weight of every word segment can be visually reflected.

In some embodiments, the core word determining module 56 comprises: a core weight calculating unit 662 for calculating a weighted sum of the cluster level weight and at least one of the local weight or the document level weight of each word segment as a core weight of each word segment; a core word determining unit 664 for determining a word segment of which the value of core weight is the largest in the commodity short text as a core word of the commodity short text.

In the following part, a device for extracting a core word of a commodity short text in some other embodiments of the present disclosure is described with reference to FIG. 7.

Figure 7:
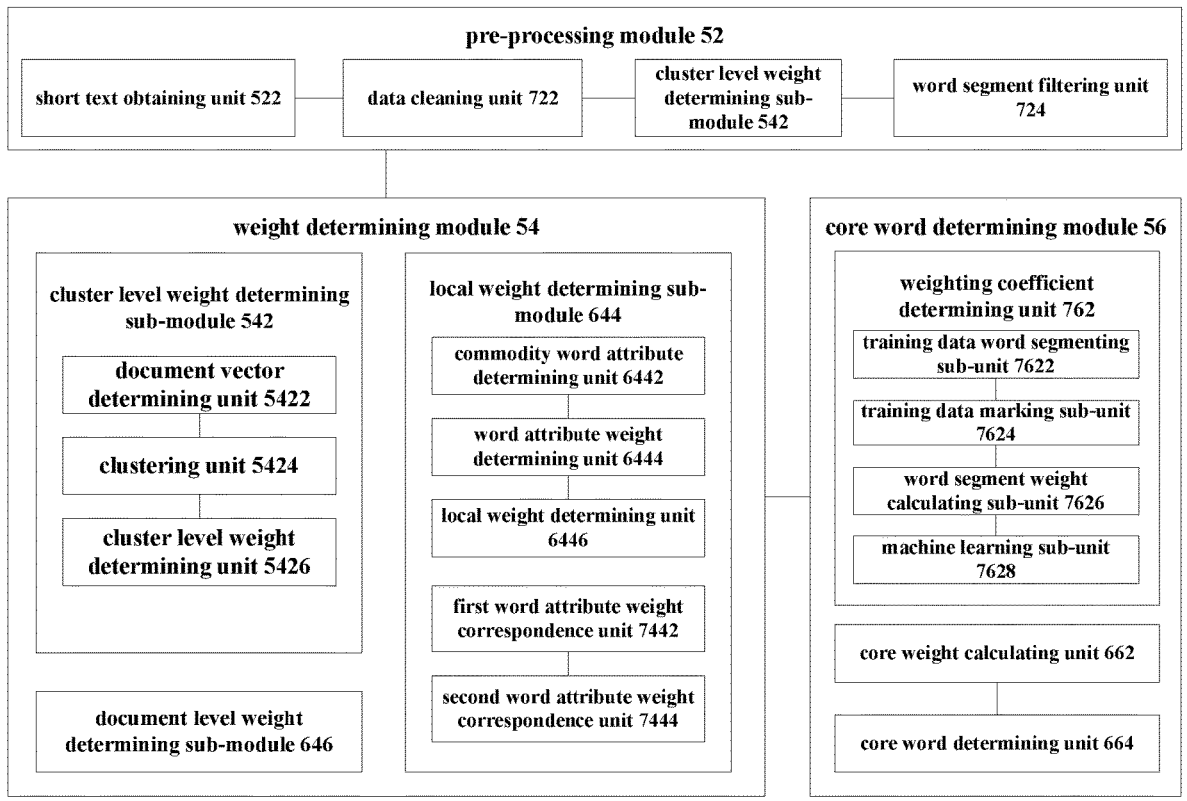
FIG. 7 is a structural diagram of still some other embodiments of a device for extracting a core word of a commodity short text in the present disclosure.

FIG. 7 is a structural diagram of still some other embodiments of a device of extracting a core word of a commodity short text in the present disclosure. As shown in FIG. 7, the local weight determining sub-module 644 may further comprise a first word attribute weight correspondence unit 7442 or a second word attribute weight correspondence unit 7444. The first word attribute weight correspondence unit 7442 is used for obtaining a training corpus which includes commodity short texts for training, and marking core words of the commodity short texts for training and commodity word attributes corresponding to the core words, and determining each word attribute weight corresponding to each commodity word attribute according to a ratio of a number of core words having the same commodity word attribute to a number of all core words in the training corpus, so as to obtain a correspondence between commodity word attributes and word attribute weights. The second word attribute weight correspondence unit 7444 is used for establishing a correspondence between search words used by users during searching and commodity short texts they clicked, and marking the search words as core words of the corresponding commodity short texts, and marking the commodity word attributes corresponding to the core words, and determining each word attribute weight corresponding to each commodity word attribute according to a ratio of a number of core words having the same commodity word attribute to a number of all core words in a training corpus, so as to obtain a correspondence between commodity word attributes and word attribute weights. The second word attribute weight correspondence unit 7444 may use, for example, a search-click log to establish the correspondence between the search word and the commodity short text he clicks.

By using statistics-based first word attribute weight correspondence unit or second word attribute weight correspondence unit to determine the word attribute weight corresponding to the commodity word attribute, it is possible to make the value of the word attribute weight be more applicable to the current environment of use thereby to improve the accuracy of core word extraction.

Moreover, the core word determining module 56 may include a weighting coefficient determining unit 762 for determining and transmitting a weighting coefficient of the cluster level weight and at least one of the local weight or the document level weight of each word segment to the core weight calculating unit 662. The weighting coefficient determining unit 762 comprises a training data word segmenting sub-unit 7622 for word segmenting each commodity short text in a training data set; a training data marking sub-unit 7624 for marking core words and non-core words of each commodity short text in the training data set; a word segment weight calculating sub-unit 7626 for calculating a cluster level weight and at least one of a local weight or a document level weight of each word segment in the training data set; a machine learning sub-unit 7628 for calculating the weighting coefficient of the cluster level weight and at least one of the local weight or the document level weight of each word segment using a machine learning method according to the cluster level weight and at least one of the local weight or the document level weight of each word segment in the training data set by taking the core words as positive samples and taking the non-core words as negative samples.

By utilizing the weighting coefficient determining unit, when determining a core word in a commodity short text according to a plurality of weights, the proportions of different weights can be adjusted to improve the accuracy of determining the core word.

Moreover, the pre-processing module 52 may further comprise a data cleaning unit 722 for removing stop words and punctuation marks in the commodity short text and transmitting the processed commodity short text to a word segmenting unit 524. Thus, the processing of non-essential words can be reduced, and the efficiency of subsequent treatment will be improved.

Moreover, the pre-processing module 52 may also include a word segment filtering unit 724 for making statistics of occurrence frequencies of all word segments in the data set and removing the word segments in the commodity short text of which the occurrence frequencies are lower than a filter threshold after word segmenting the commodity short text. In this way, the efficiency of extracting core words can be improved.

Figure 8:
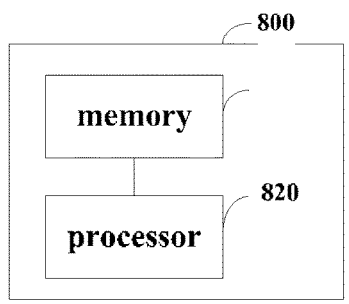
FIG. 8 is a structural diagram of still some other embodiments of a device for extracting a core word of a commodity short text in the present disclosure.

FIG. 8 is a structural diagram of some other embodiments of a device of extracting a core word of a commodity short text in the present disclosure. As shown in FIG. 8, the device 800 in the embodiments include: a memory 810 and a processor 820 coupled to the memory 810, wherein the processor 820 is configured to execute the method of extracting a core word of a commodity short text in any of the previous embodiments on a basis of instructions stored in the memory 810.

In some embodiments, the memory 810 may include, for example, a system memory, a fixed non-volatile storage medium, or the like. The system memory stores, for example, an operating system, an application, a boot loader, and other programs.

Figure 9:
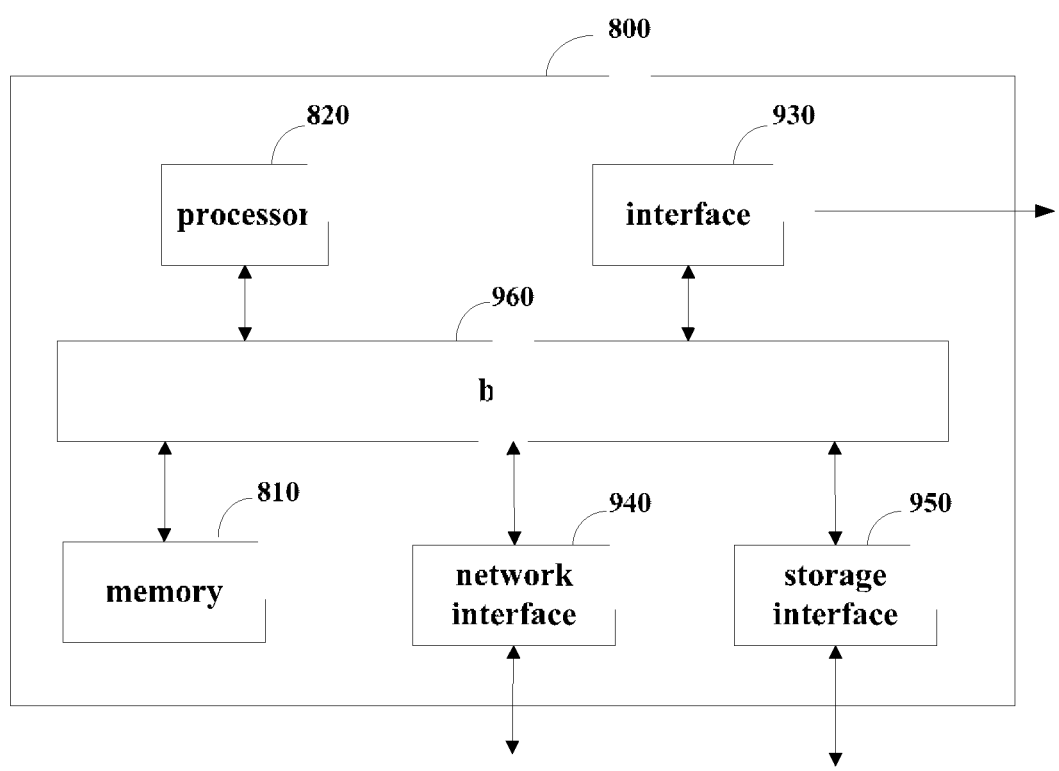
FIG. 9 is a structural diagram of still some other embodiments of a device for extracting a core word of a commodity short text in the present disclosure.

FIG. 9 is a structural diagram of still some other embodiments of a device of extracting a core word of a commodity short text in the present disclosure. As shown in FIG. 9, the device 800 in the embodiments include: a memory 810 and a processor 820, and may also include an input/output interface 930, a network interface 940, a storage interface 950, etc. The interfaces 930, 940, 950, the memory 810 and the processor 820 may be connected, for example, via a bus 960. The input/output interface 930 provides a connection interface for input/output devices such as a display, a mouse, a keyboard, a touchscreen, and the like. The network interface 940 provides a connection interface for various networked devices. The storage interface 950 provides a connection interface for an external storage device such as an SD card or a USB flash disk, etc.

One skilled in the art should understand that, the embodiments of the present disclosure may be provided as a method, a system, or a computer program product. Therefore, the embodiments of the present disclosure can take the form of an entirely hardware embodiment, an entirely software embodiment or an embodiment containing both hardware and software elements. Moreover, this disclosure can be in a form of one or more computer program products containing the computer-executable codes which can be implemented in the computer-executable non-transitory storage media (including but not limited to disk memory, CD-ROM, optical memory, etc.).

The present disclosure is described with reference to the flow charts and/or block diagrams of the method, device (system) and computer program product according to the embodiments of the present disclosure. It shall be understood that each flow and/or block in the flowcharts and/or block diagrams and a combination of the flows and/or blocks in the flowcharts and/or block diagrams can be implemented by computer program instructions. These computer program instructions can be provided to a general purpose computer, a special purpose computer, an embedded processor, or a processor of other programmable data processing devices so as to generate a machine for generating means for implementing the functions of one or more flows of a flowchart and/or one or more blocks of a block diagram by using the instructions executed by the computer or the processor of other programmable data processing devices.

These computer program instructions can also be stored in a computer readable memory guiding the computer or other programmable data processing devices to work in a particular way, such that the instructions stored in the computer readable memory generate an article of manufacture containing instruction means which implement the functions of one or more flows of a flowchart and/or one or more blocks in a block diagram.

These computer program instructions can also be loaded onto a computer or other programmable data processing devices such that a series of operational steps are performed on a computer or other programmable devices to produce computer-implemented processing, so that the instructions executed on a computer or other programmable devices provide steps for implementing the functions of one or more flows of a flowchart and/or one or more blocks of a block diagram.

The above content is only preferred embodiments of this present disclosure, but cannot be used for limiting this disclosure. Any modification, equivalent replacement and improvement, etc. within the spirit and principle of this disclosure shall be contained in the scope of protection of this disclosure.

What is claimed is:

1. A method for extracting a core word of a commodity short text, comprising:
    obtaining a training corpus which includes commodity short texts in a data set for training;
    performing word segmenting on each commodity short text;
    obtaining a document vector of the commodity short text according to context of word segments of the commodity short text;

clustering the commodity short texts in the data set according to document vectors;
determining a cluster level weight of each word segment of the commodity short text in a category to which the commodity short text belongs;
establishing a correspondence between search words used by users during searching and commodity short texts the users clicked according to a search-click log;
marking the search words as core words of the corresponding commodity short texts, and marking commodity word attributes corresponding to the core words;
determining each word attribute weight corresponding to each commodity word attribute according to a ratio of a number of core words having the same commodity word attribute to a number of all core words in the training corpus, so as to obtain a correspondence between commodity word attributes and word attribute weights;
determining one or more commodity word attributes of each word segment in the commodity short text;
determining a word attribute weight corresponding to the word segment in the commodity short text according to a correspondence between commodity word attributes and word attribute weights;
determining a local weight of each word segment according to the word attribute weight of each word segment in the commodity short text; and
determining a core word of the commodity short text according to the local weight and the cluster level weight of each word segment,
wherein commodity short texts having a search word as a core word are used as searching results during searching.

2. The method according to claim 1, wherein the determining a core word of the commodity short text according to the cluster level weight of each word segment comprises:
determining a core word of the commodity short text according to the cluster level weight and a document level weight of each word segment;
wherein the document level weight of each word segment is determined according to an inverse file frequency of each word segment of the commodity short text in the data set.

3. The method according to claim 1, wherein the obtaining a document vector of the commodity short text according to context of word segments of the commodity short text comprises:
determining a window parameter according to an average length of the commodity short texts in the data set;
performing computation by using a vector operation tool word2vec and taking the data set as an input corpus and taking the window parameter as a window size to obtain a document vector of the commodity short text in the data set.

4. The method according to claim 1, wherein the determining cluster level weight of each word segment of the commodity short text in a category to which the commodity short text belongs comprises:
calculating a chi-square value of each word segment of the commodity short text in the category to which the commodity short text belongs by using a chi-square formula, and
determining a cluster level weight of each word segment of the commodity short text in the category to which the commodity short text belongs according to the chi-square value.

5. The method according to claim 2, further comprising:
marking core words of the commodity short texts for training and commodity word attributes corresponding to the core words; and
determining each word attribute weight corresponding to each commodity word attribute according to a ratio of a number of core words having the same commodity word attribute to a number of all core words in the training corpus, so as to obtain a correspondence between commodity word attributes and word attribute weights.

6. The method according to claim 2, wherein, the determining a core word of the commodity short text according to the cluster level weight and at least one of a local weight or a document level weight of each word segment comprises:
calculating a weighted sum of the cluster level weight and at least one of a local weight or a document level weight of each segment as a core weight of each word segment; and
determining a word segment of which the value of core weight is the largest in the commodity short text as a core word of the commodity short text.

7. The method according to claim 6, further comprising:
word segmenting each commodity short text in a training data set;
marking core words and non-core words of each commodity short text in the training data set;
calculating a cluster level weight and at least one of a local weight or a document level weight of each word segment in the training data set; and
calculating a weighting coefficient of the cluster level weight and at least one of the local weight or the document level weight using a machine learning method according to the cluster level weight and at least one of the local weight or the document level weight of each word segment in the training data set by taking the core words as positive samples and taking the non-core words as negative samples.

8. The method according to claim 1, wherein, the commodity short texts include commodity title, commodity review or commodity information page content.

9. The method according to claim 2, wherein the commodity word attributes include one or more of brand, category, noun and attribute word.

10. A device for extracting a core word of a commodity short text, comprising:
a memory; and
a processor coupled to the memory, which is configured to execute the method for performing operations comprising:
obtaining a training corpus which includes commodity short texts in a data set for training;
performing word segmenting on each commodity short text;
obtaining a document vector of the commodity short text according to context of word segments of the commodity short text;
clustering the commodity short texts in the data set according to document vectors;
determining a cluster level weight of each word segment of the commodity short text in a category to which the commodity short text belongs;
establishing a correspondence between search words used by users during searching and commodity short texts the users clicked according to a search-click log;

marking the search words as core words of the corresponding commodity short texts, and marking commodity word attributes corresponding to the core words;

determining each word attribute weight corresponding to each commodity word attribute according to a ratio of a number of core words having the same commodity word attribute to a number of all core words in the training corpus, so as to obtain a correspondence between commodity word attributes and word attribute weights;

determining one or more commodity word attributes of each word segment in the commodity short text;

determining a word attribute weight corresponding to the word segment in the commodity short text according to a correspondence between commodity word attributes and word attribute weights;

determining a local weight of each word segment according to the word attribute weight of each word segment in the commodity short text; and determining a core word of the commodity short text according to the local weight and the cluster level weight of each word segment, wherein commodity short texts having a search word as a core word are used as searching results during searching.

11. The device according to claim 10, wherein the determining a core word of the commodity short text according to the cluster level weight of each word segment comprises:

determining a core word of the commodity short text according to the cluster level weight and a document level weight of each word segment;

wherein the document level weight of each word segment is determined according to an inverse file frequency of each word segment of the commodity short text in the data set.

12. The device according to claim 10, wherein the obtaining a document vector of the commodity short text according to context of word segments of the commodity short text comprises:

determining a window parameter according to an average length of the commodity short texts in the data set; and performing computation by using a vector operation tool word2vec and taking the data set as an input corpus and taking the window parameter as a window size to obtain a document vector of the commodity short text in the data set.

13. The device according to claim 10, wherein the determining cluster level weight of each word segment of the commodity short text in a category to which the commodity short text belongs comprises:

calculating a chi-square value of each word segment of the commodity short text in the category to which the commodity short text belongs by using a chi-square formula; and determining a cluster level weight of each word segment of the commodity short text in the category to which the commodity short text belongs according to the chi-square value.

14. The device according to claim 11, wherein the operations further comprise:

marking core words of the commodity short texts for training and commodity word attributes corresponding to the core words; and determining each word attribute weight corresponding to each commodity word attribute according to a ratio of a number of core words having the same commodity word attribute to a number of a core words in the training corpus, so as to obtain a correspondence between commodity word attributes and word attribute weights.

15. The device according to claim 11, wherein, the determining a core word of the commodity short text according to the cluster level weight and at least one of a local weight or a document level weight of each word segment comprises:

calculating a weighted sum of the cluster level weight and at least one of a local weight or a document level weight of each segment as a core weight of each word segment; and determining a word segment of which the value of core weight is the largest in the commodity short text as a core word of the commodity short text.

16. The device according to claim 15, wherein the operations further comprise:

word segmenting each commodity short text in a training data set;

marking core words and non-core words of each commodity short text in the training data set;

calculating a cluster level weight and at least one of a local weight or a document level weight of each word segment in the training data set; and calculating a weighting coefficient of the cluster level weight and at least one of the local weight or the document level weight using a machine learning method according to the cluster level weight and at least one of the local weight or the document level weight of each word segment in the training data set by taking the core words as positive samples and taking the non-core words as negative samples.

17. A non-transitory computer readable storage medium storing a computer program that, when being executed by a processor, implements the method for performing operations comprising:

obtaining a training corpus which includes commodity short texts in a data set for training;

performing word segmenting on each commodity short text;

obtaining a document vector of the commodity short text according to context of word segments of the commodity short text;

clustering the commodity short texts in the data set according to document vectors;

determining a cluster level weight of each word segment of the commodity short text in a category to which the commodity short text belongs; and determining a core word of the commodity short text according to the duster level weight of each word segment.

* * * * *